United States Patent Office 3,475,608
Patented Oct. 28, 1969

3,475,608
THERMAL, MOVING TARGET, INTRUSION DETECTOR
Herman I. Pardes, Wanamassa, N.J., assignor to the United States of America as represented by the Secretary of the Army
Filed Nov. 2, 1967, Ser. No. 680,151
Int. Cl. H01j 39/02
U.S. Cl. 250—83.3      4 Claims

ABSTRACT OF THE DISCLOSURE

An infrared surveillance system including a rotating prismatic reflector for scanning a field of view. Energy reflected by the prism is focused by an optic system on a bank of infrared detectors. A tape recorder stores a scanning cycle. A subsequent scanning cycle is then compared with the stored cycle in a differential amplifier to detect any differences in the I-R radiation pattern. These differences are displayed on an electronic display device such as a CRT.

---

The invention described herein may be manufactured, used, and licensed by or for the Government for governmental purposes without the payment to me of any royalty thereon.

The present invention relates to surveillance devices and more particularly to a moving target detector.

In the field of surveillance it has been the general practice to employ radar systems to detect moving targets. However, such devices have not proved entirely satisfactory under security conditions, since the radar is an active device and the energy transmitted thereby is subject to detection. Therefore, those concerned with the development of surveillance equipment have long recognized the value and need of highly accurate passive surveillance devices. The present invention fulfills this need.

The general purpose of this invention is to provide an infrared scanning and detection system which will scan a given area and compare the amount of energy, emitted therefrom with a reference. Any difference between the reference and the pattern detected will be an indication of a change which may be due to a moving target in the area. Repeated scans of the area will indicate the direction of movement of the suspected target. The target may be displayed on an electronic display such as a cathode ray tube or the like.

An object of the present invention is the provision of a passive surveillance device.

Another object is to provide a surveillance device which will use a relatively small amount of power.

A further object of the invention is the provision of a passive surveillance device which will be relatively compact.

Still another object is to provide a highly accurate passive moving target indicator.

The exact nature of this invention as well as other objects and advantages thereof will be readily apparent from consideration of the following specification relating to the annexed drawing in which.

Figure 1:
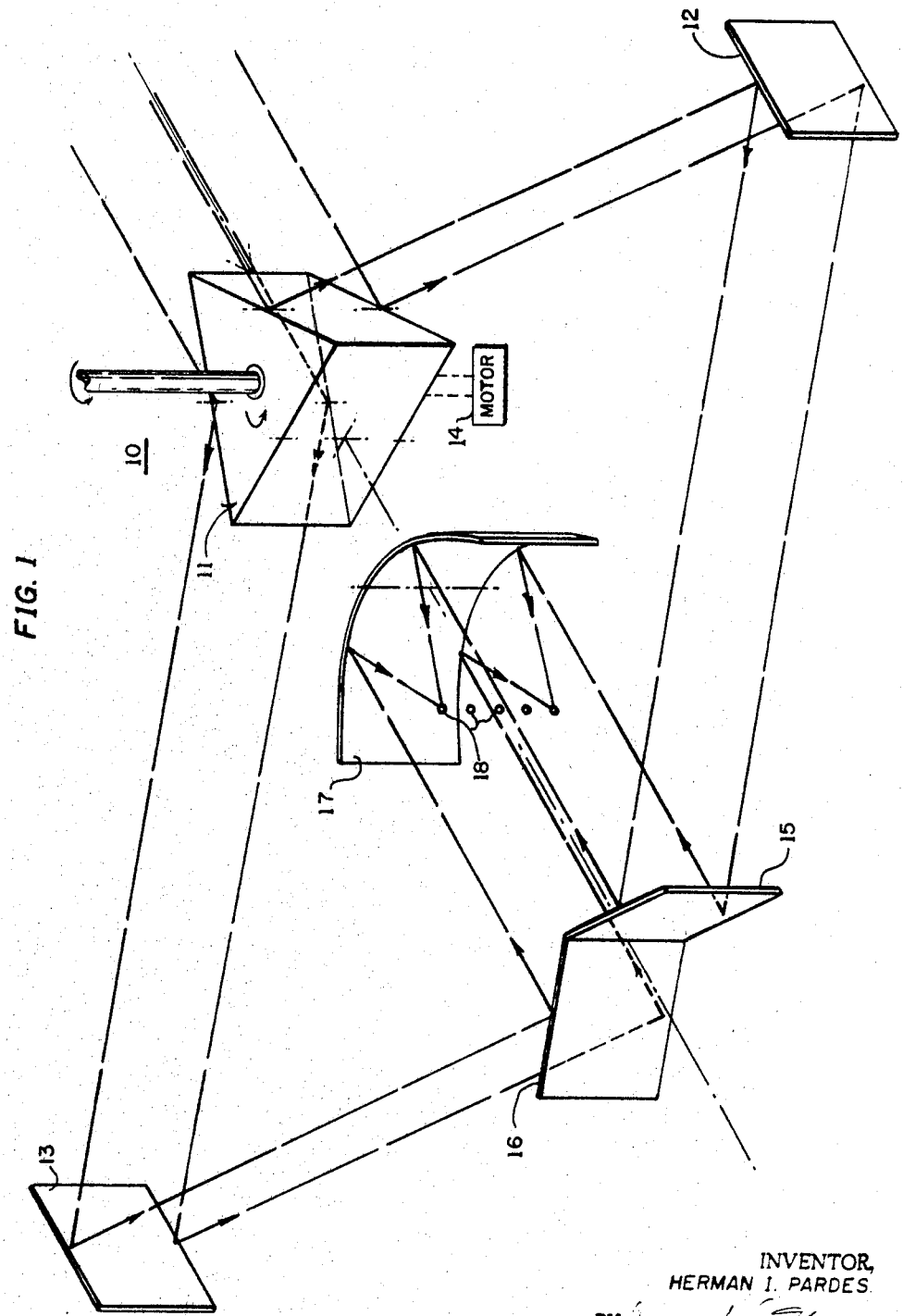
FIGURE 1 shows a schematic isometric view of a preferred embodiment of the optical system of the invention.

Referring now to the drawing there is shown in FIGURE 1 an infrared surveillance device comprising an optical system 10 having a scanning triangular prism 11 for reflecting infrared energy towards a pair of planar reflectors 12 and 13. Prism 11 is rotated in a horizontal plane by a motor 14. A second pair of planar reflectors 15 and 16 are arranged such as to reflect the energy being reflected by reflectors 12 and 13 respectively towards a cylindrical parabolic reflector 17. The energy being reflected by reflectors 15 and 16 is directed along lines which are parallel to each other and parallel to the principle plane of the parabolic reflector 17.

The energy being reflected by reflector 17 will focus at the focal axis where a plurality of infrared detectors 18 are aligned. Detectors 18 may be thermistors or any other suitable thermal radiation detector.

Figure 2:
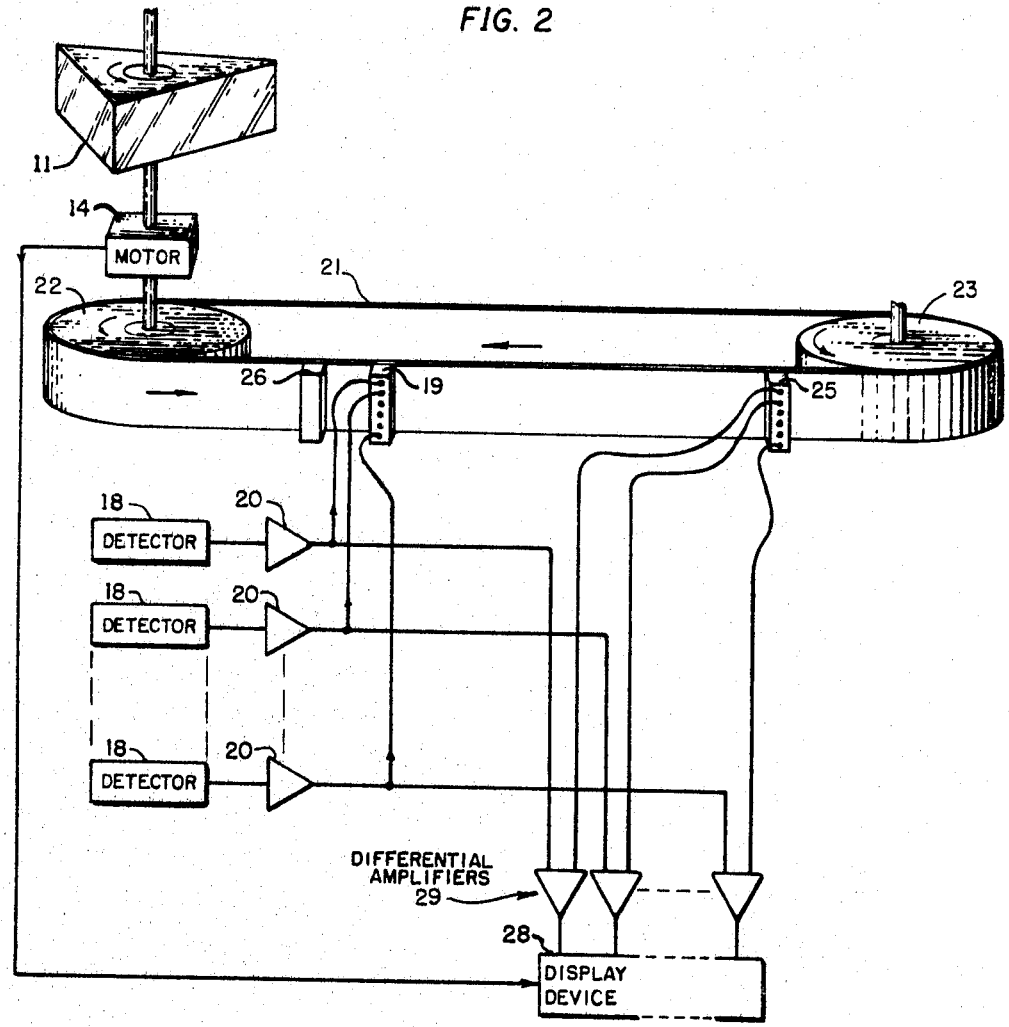
FIGURE 2 shows a block diagram of the electrical read-out system of the invention.

The outputs of detectors 18, as shown in FIGURE 2, are each connected to the magnetic "write" head assembly 19 via an amplifier 20. The assembly 19 comprises a plurality of write heads, one for each of the detectors 18. A magnetic recording tape 21, which is mounted on drive pulley 22 and idler pulley 23, passes the head assembly 19 such that a recording of the detected information is stored on a plurality of parallel tracks with a different track for each detector 18.

A magnetic "read" head assembly 25 comprises a plurality of read heads, one for each of the recording tracks, and is mounted such that during a one-third of a revolution of the prism 11 the portion of the magnetic tape 21 which is directly under head assembly 19 will move to the location directly under head assembly 25.

A magnetic "erase" head assembly 26 is mounted just before head assembly 19 to clear the several tracks on tape 21 of information previously written thereon.

Therefore, as the prism 11 rotates a signal proportional to the amount of infrared energy emitted from the scanned area which is detected by detectors 18 will be recorded on tape 21 by head 19. After one complete scan has been made which is equivalent to a one-third revolution of the prism 11, head 25 will start to read the signals which have just been recorded and head 19 will start recording on tape 21 the signals being received as a result of the next scan.

The inputs to a plurality of differential amplifiers 29 are each connected to different but corresponding outputs of amplifiers 20 and head 25. Therefore, the corresponding signals from two successive scans of prisms 11 are compared by amplifiers 29 which produce outputs which are proportional to the difference in these signals. These difference signals, which indicate a change in the emission pattern of the scanned area between successive scans of the area, may now be displayed on the electronic display device 28.

The display device could, for example, be a cathode ray tube having a plurality of parallel beams each controlled by the amplitude of a different one of the outputs of amplifiers 29. The sweep signals for the beams are controlled by the rotation of the motor 14, such that for each one-third rotation of the prism 11 the sweep signal completes a full cycle.

Changes in the emission pattern are usually a result of the movement of targets in the area. The movements of the target and the location in two dimensions may be determined or read from display 28 since there are a plurality of detectors and the area is scanned. It is possible in rare cases to have targets which do not move on the display 28 from scan to scan. These targets may be either stationary or moving in a radial direction. Such targets may be easily detected, however, by simply using two scanners spatially located. In such cases, the three dimensional location of the targets may also be determined.

Obviously many modifications and variations of the present invention are possible in the light of the above teachings. It is, therefore, to be understood, that within the scope of the appended claims, the invention may be practiced otherwise then as specifically described.

What is claimed is:

1. An infrared surveillance device comprising a rotating reflector means for scanning a field of view; a plurality of infrared detector means for generating signals in response to the detection of infrared radiation; means for concentrating infrared energy reflected by said reflector means onto said detector means; said plurality of detector means arranged such that each said detector means receives simultaneously energy reflected from different locations in said field of view which are linearly disposed; signal comparing means for comparing the output of each said detector means with a previously stored output of the same said detector means to determine any changes in the radiation pattern emitted by said field of view; and means responsive to said signal comparing means for generating a signal in response to a change in the radiation pattern of said field of view.

2. The device according to claim 1 and wherein said signal comparing means includes a signal storage means for storing a first complete cycle of the outputs of said detector means, a difference means having inputs connected to the outputs of said storage means and said detector means for providing output signals which are a function of the difference between said stored first complete cycle and a subsequent complete cycle of the outputs of said detector means, and synchronizing means for phasing the outputs of said detector means and said storage means such that the signals thereon are simultaneously associated with corresponding locations of said field of view.

3. The device according to claim 2 and further including display means for displaying said difference signals and their relative location in said field of view.

4. The device according to claim 2 and further including display means for displaying the location of said difference signals in a complete scanning cycle.

References Cited

UNITED STATES PATENTS 3,211,046 10/1965 Kennedy -------- 250—83.3 X
3,004,160 10/1961 Tittle ------------ 250—83.1

RALPH G. NILSON, Primary Examiner

D. L. WILLIS, Assistant Examiner

U.S. Cl. X.R.

250—83